(12) United States Patent
Rose et al.

(10) Patent No.: US 8,229,118 B2
(45) Date of Patent: Jul. 24, 2012

(54) METHOD AND APPARATUS FOR AUTHENTICATION IN WIRELESS COMMUNICATIONS

(75) Inventors: Gregory G. Rose, Concord (AU); Michael Paddon, Kellyville (AU); Philip M. Hawkes, Burwood (AU); James F. Semple, London (GB)

(73) Assignee: QUALCOMM Incorporated, San Diego, CA (US)

( * ) Notice: Subject to any disclaimer, the term of this patent is extended or adjusted under 35 U.S.C. 154(b) by 1633 days.

(21) Appl. No.: 10/944,155

(22) Filed: Sep. 16, 2004

(65) Prior Publication Data

US 2005/0100165 A1    May 12, 2005

Related U.S. Application Data (60) Provisional application No. 60/518,041, filed on Nov. 7, 2003.

(51) Int. Cl.
*H04K 1/00* (2006.01)
(52) U.S. Cl. ............................. 380/247; 380/270; 380/44
(58) Field of Classification Search .................... 380/46, 380/247, 270, 44; 713/171
See application file for complete search history.

(56) References Cited

U.S. PATENT DOCUMENTS

| | | | | |
|---|---|---|---|---|
| 5,371,794 A * | 12/1994 | Diffie et al. | ................... | 713/156 |
| 5,455,863 A * | 10/1995 | Brown et al. | ................... | 380/247 |
| 5,602,915 A * | 2/1997 | Campana et al. | ............. | 380/277 |
| 5,602,917 A * | 2/1997 | Mueller | ......................... | 380/284 |
| 5,689,563 A * | 11/1997 | Brown et al. | ................. | 380/247 |
| 5,809,140 A * | 9/1998 | Rubin et al. | ................... | 380/279 |
| 5,915,021 A * | 6/1999 | Herlin et al. | ..................... | 705/67 |
| 6,023,689 A * | 2/2000 | Herlin et al. | ..................... | 705/67 |
| 6,580,906 B2 * | 6/2003 | Bilgic et al. | ............... | 455/422.1 |
| 6,584,310 B1 * | 6/2003 | Berenzweig | ............... | 455/432.1 |
| 6,591,364 B1 * | 7/2003 | Patel | ............................. | 713/170 |
| 6,711,400 B1 * | 3/2004 | Aura | ............................. | 455/411 |
| 6,769,060 B1 * | 7/2004 | Dent et al. | ..................... | 713/168 |
| 6,857,075 B2 * | 2/2005 | Patel | ............................. | 713/171 |
| 7,065,340 B1 * | 6/2006 | Einola et al. | .................. | 455/410 |
| 7,096,494 B1 * | 8/2006 | Chen | .................................. | 726/9 |
| 7,107,620 B2 * | 9/2006 | Haverinen et al. | ............... | 726/29 |
| 7,158,777 B2 * | 1/2007 | Lee et al. | ....................... | 455/411 |
| 7,181,196 B2 * | 2/2007 | Patel | ............................. | 455/411 |

(Continued)

FOREIGN PATENT DOCUMENTS

EP    0506637    9/1992

(Continued)

OTHER PUBLICATIONS

"A précis of the new attacks on GSM encryption" by Greg Rose, QUALCOMM Australia, Sep. 10, 2003, pp. 1-3.

(Continued)

*Primary Examiner* — David Garcia Cervetti
(74) *Attorney, Agent, or Firm* — Kristine U. Ekwueme (57) ABSTRACT

Systems and methods of securing wireless communications between a network and a subscriber station include inserting a marker denoting an encryption type within a random value used for authentication, calculating a first session key and a first response value as a function of the random value, then calculating a second session key and a second response value as a function of the random value, first session key and first response value. The two levels of session keys and response values may be used by upgraded subscriber stations and network access points to prevent attackers from intercepting authentication triplets.

36 Claims, 7 Drawing Sheets

U.S. PATENT DOCUMENTS

| | | | |
|---|---|---|---|
| 7,181,629 B1* | 2/2007 | Hatanaka et al. | 713/194 |
| 7,203,312 B1* | 4/2007 | Hatanaka et al. | 380/201 |
| 7,231,203 B2* | 6/2007 | Marcelli | 455/411 |
| 7,317,798 B2* | 1/2008 | Saito | 380/277 |
| 7,340,055 B2* | 3/2008 | Hori et al. | 380/201 |
| 7,352,866 B2* | 4/2008 | Panjwani et al. | 380/270 |
| 7,424,615 B1* | 9/2008 | Jalbert et al. | 713/171 |
| 7,428,307 B2* | 9/2008 | Hori et al. | 380/277 |
| 7,472,273 B2* | 12/2008 | Haverinen | 713/168 |
| 7,512,796 B2* | 3/2009 | Haverinen et al. | 713/168 |
| 7,565,135 B2* | 7/2009 | Patel | 455/411 |
| 7,653,200 B2* | 1/2010 | Karmi et al. | 380/270 |
| 7,765,404 B2* | 7/2010 | Lamberg | 713/181 |
| 2002/0012433 A1* | 1/2002 | Haverinen et al. | 380/247 |
| 2002/0018569 A1* | 2/2002 | Panjwani et al. | 380/247 |
| 2002/0066018 A1* | 5/2002 | Linnartz | 713/171 |
| 2002/0071558 A1* | 6/2002 | Patel | 380/270 |
| 2002/0145051 A1* | 10/2002 | Charrin | 235/492 |
| 2002/0169958 A1* | 11/2002 | Nyman et al. | 713/168 |
| 2002/0169966 A1* | 11/2002 | Nyman et al. | 713/182 |
| 2002/0178358 A1* | 11/2002 | Perkins et al. | 713/169 |
| 2002/0184154 A1* | 12/2002 | Hori et al. | 705/50 |
| 2002/0184492 A1* | 12/2002 | Hori et al. | 713/158 |
| 2003/0051140 A1* | 3/2003 | Buddhikot et al. | 713/169 |
| 2003/0070067 A1* | 4/2003 | Saito | 713/150 |
| 2003/0157926 A1* | 8/2003 | Ala-Laurila et al. | 455/406 |
| 2003/0171112 A1* | 9/2003 | Lupper et al. | 455/414.1 |
| 2004/0077335 A1* | 4/2004 | Lee et al. | 455/410 |
| 2004/0078571 A1* | 4/2004 | Haverinen | 713/168 |
| 2004/0131185 A1* | 7/2004 | Kakumer | 380/247 |
| 2004/0179691 A1* | 9/2004 | Hori et al. | 380/277 |
| 2004/0224666 A1* | 11/2004 | Jain et al. | 455/411 |
| 2004/0229597 A1* | 11/2004 | Patel | 455/411 |
| 2004/0236964 A1* | 11/2004 | Haverinen | 713/201 |
| 2005/0031124 A1* | 2/2005 | Jain et al. | 380/270 |
| 2005/0076232 A1* | 4/2005 | Kawaguchi | 713/200 |
| 2005/0090256 A1* | 4/2005 | Dutta | 455/435.2 |
| 2005/0111666 A1* | 5/2005 | Blom et al. | 380/277 |
| 2005/0114680 A1* | 5/2005 | Chinnaswamy et al. | 713/185 |
| 2005/0124288 A1* | 6/2005 | Karmi et al. | 455/3.01 |
| 2005/0160044 A1* | 7/2005 | Hori et al. | 705/51 |
| 2005/0177733 A1* | 8/2005 | Stadelmann et al. | 713/185 |
| 2005/0189416 A1* | 9/2005 | Charrin | 235/440 |
| 2005/0286721 A1* | 12/2005 | Lamberg | 380/270 |
| 2006/0004643 A1* | 1/2006 | Stadelmann et al. | 705/34 |
| 2006/0050680 A1* | 3/2006 | Naim et al. | 370/352 |
| 2006/0143453 A1* | 6/2006 | Imamoto et al. | 713/169 |
| 2006/0189298 A1* | 8/2006 | Marcelli | 455/411 |
| 2007/0021105 A1* | 1/2007 | Patel | 455/411 |
| 2007/0060106 A1* | 3/2007 | Haverinen et al. | 455/410 |
| 2007/0160201 A1* | 7/2007 | Blom et al. | 380/30 |
| 2009/0006850 A1* | 1/2009 | Birger et al. | 713/169 |
| 2009/0183003 A1* | 7/2009 | Haverinen | 713/168 |

FOREIGN PATENT DOCUMENTS

| | | |
|---|---|---|
| EP | 1005244 A1 | 11/1998 |
| JP | 7297819 A | 11/1995 |
| JP | 08500950 | 1/1996 |
| JP | 11511629 | 10/1999 |
| JP | 2003318894 | 11/2003 |
| WO | WO99004587 | 1/1999 |
| WO | WO99057689 | 11/1999 |
| WO | WO0113666 | 2/2001 |
| WO | WO0124560 | 4/2001 |
| WO | 01/89253 A1 | 11/2001 |

OTHER PUBLICATIONS

"Enhancements to GSM/UMTS AKA" Ericsson, Document for Discussion, 3GPP TSG SA WG3 Security, S3-030542, Povoa de Varzim, Portugal, Oct. 6-10, 2003, pp. 1-3.

H. Krawczyk et al. "Keyed-Hashing for Message Authentication" Network Working Group, Informational, rfc2104 HMAC, Feb. 1997, pp. 1-10.

"Secure Hash Standard" Federal Information Processing Standards Publication 180-2, Aug. 1, 2002, pp. i-iv. 1-71.

"Further development of the Special RAND mechanism" Orange, Vodafone, Document for Discussion/Decision, 3GPP TSG SA WG3 (Security) meeting #30, S3-030588, Povoa de Varzim, Portugal, Oct. 7-10, 2003, pp. 1-4.

Elad Barkan et al. "Instant Ciphertext-Only Cryptanalysis of GSM Encrypted Communication" Computer Science Department, Technion, Israel; Department of Mathematics, Technion, Israel, pp. 1-18.

International Search Report and Written Opinion—PCT/US2004/036538, International Search Authority—European Patent Office—Apr. 28, 2005.

* cited by examiner

METHOD AND APPARATUS FOR AUTHENTICATION IN WIRELESS COMMUNICATIONS

CLAIM OF PRIORITY UNDER 35 U.S.C. §119

The present application for patent claims priority to Provisional Application No. 60/518,041 entitled "Authentication and Key Separation for Securing GSM Systems" filed Nov. 7, 2003, and assigned to the assignee hereof and hereby expressly incorporated by reference herein.

BACKGROUND

1. Field

The present disclosure relates generally to wireless telecommunications and, more specifically, to a method of securing wireless telecommunications systems.

2. Background

One cellular technology for wireless communications is defined by the Global System for Mobile (GSM) protocol. GSM has been further extended by new services, such as General Packet Radio Service (GPRS), which offers Internet content and packet-based data services for GSM networks. GSM is used for many types of wireless communications including voice, Internet browsing, e-mail and multimedia data. GSM incorporates various security mechanisms to protect the content communicated over such systems. Service providers and users alike rely on these security mechanisms for the privacy of their communications and protection of their data. The security mechanisms typically operate by authenticating users to the network, then user encrypting data before transmission over the air. Such security measures are subject to attack by third parties. There is a need therefore, for a method and apparatus for secure wireless communications.

DETAILED DESCRIPTION

Encryption is a process of modifying data for protection against access by a non-authorized third party. This technique generally employs ciphering of data transmitted over an air interface, e.g., between subscriber stations and base stations, as well as over other wireless or wireline links, to a desired remote party. Ciphering refers in general to encoding data in such a way that only the recipient with the proper "key" can decode it. Ciphering may be achieved, for example, by performing an exclusive-OR operation between a pseudo-random bit sequence and the bits of a normal burst of communications data. Only when a recipient has the proper key may the operation be "undone" and the burst of communications data extracted.

One type of encryption used in wireless communications systems is performed using a stream cipher. The encryption algorithm for stream cipher takes a secret key known only to the user's device (such as a cellular phone or specifically, a Subscriber Identity Module (SIM) card inside of a device) and a frame number, and generates a pseudo-random stream of bits (i.e., keystream) to be XORed with the input for encryption. The information is also used decrypt received data. Thus, the bits are effectively encrypted independently of one another.

Two algorithms commonly used to generate the pseudo-random sequence for use as described above are the A5/1 and A5/2 algorithms. Original GSM protocols support three levels of security for airlink encryption: unencrypted; A5/2; and A5/1 encrypted. The A5 algorithm is used for encryption optionally on voice or data connections. A5 is a stream cipher, using a 64-bit cipher key, but is block based with a block length of 228 bits. A5 is designed to be efficiently implemented in hardware, involving only XOR and one-bit addition operations. A5 has two versions: A5/1 used in Europe; and A5/2 used in export systems. Both A5/1 and A5/2 are stream-cipher algorithms used for encryption, but each provides slightly different security and incurs different complexity. As will be recognized by those skilled in the art, A5 is part of the GSM specification. A5/1 is known as the "strong" export-limited version, and A5/2 is the standard and "weak" version having no export limitations. Another version of A5 encryption sometimes used is A5/3, which is based on the block-cipher Universal Mobile Telecommunications System (UMTS)/Wideband Code Division-Multiple Access (WCDMA) algorithm known as "KASUMI." Kasumi is a 64-bit block cipher using a true 128-bit key.

Each of these algorithms uses, as the secret key, a 64-bit session key ($K_c$) derived by an authentication mechanism, such as according to a standard GSM-supported authentication mechanism. GSM security is based on a challenge-response mechanism using a secret 128-bit key ($K_i$) stored on the SIM card and on the user's home network Authentication Center (AuC). During initialization of an active session, the AuC generates a 128-bit randomly chosen value (RAND) and applies an authentication algorithm such as A3 or A8, also part of the GSM specification, to the RAND. The algorithm generates both an expected response (SRES) and an encryption key for the session (the $K_c$), each of which are functions of the RAND and the $K_i$. The RAND, SRES and $K_c$ collectively constitute a GSM Authentication Vector (authentication triplet).

During registration, the authentication triplet is issued to the base station, which forwards the RAND to the subscriber station. The SIM card in the subscriber station reads the RAND and computes the SRES and session key $K_c$ according to the same authentication algorithm or key agreement algorithms (A3 or A8, respectively), using its secret key $K_i$. The calculated SRES value is sent to the base station, which can compare it to the SRES in the authentication triplet, thereby authenticating the subscriber station's validity. Once the subscriber station is authenticated, the $K_c$ may be used for encryption of communications during the active session, as directed by the base station.

Unfortunately, the A5 algorithms are susceptible to third party attacks, causing both the data and the network to be compromised. Generally speaking, encryption of data communicated on wireless systems is performed after coding for error correction. It is well-known that coding introduces known linear relationships between the bits to be encrypted. Thus, although an attacker might not know the actual values of individual input bits, they may know certain groups will XOR to zero, in accordance with the known linear relationships of coding. Such known relationships may allow attackers to break into secured communications without specific knowledge of the content of data being encrypted.

Such attacks are known as "ciphertext only" attacks, and have been demonstrated as effective against the various A5 encryption algorithms. One example of such an attack is a "Man In The Middle" attack (MITM) as disclosed by Biham et al. Basically, the MITM attack against GSM involves a false base station able to interject itself into the authentication process and intercept both the RAND and the SRES. The false base station forces the subscriber station to use the weaker A5/2 algorithm for encryption after authentication. Only a small amount of A5/2 encrypted communication is required in order for the false base station to break out the $K_c$ from the A5/2 traffic. At that point, the false base station may act as a translator between the A5/2 encryption on the leg between the subscriber station and the false base station, and whichever encryption is requested by the real base station on the leg between the false base station and the real base station. More importantly, the false base station is able to recover the entire authentication triplet, which may then be re-used, such as for hijacking phone calls or establishing false service. Further, although stronger A5 algorithms, such as A5/3, have been developed, since $K_c$ works with any of these algorithms, even the stronger ones are undermined by the security flaws in weaker algorithms allowing the $K_c$ to be intercepted in the first place.

Although proposals have been made for protecting against this type of attack, there is currently no effective solution that would not require significant changes to standard GSM protocols or equipment. Also, changes to SIMs and deployed subscriber stations may be impossible or impracticable to implement. Changes to the network infrastructure would also be cumbersome, costly, and difficult to synchronize. Thus, currently proposed solutions to the threat of these attacks may be too costly or impracticable to actually implement.

Figure 1:
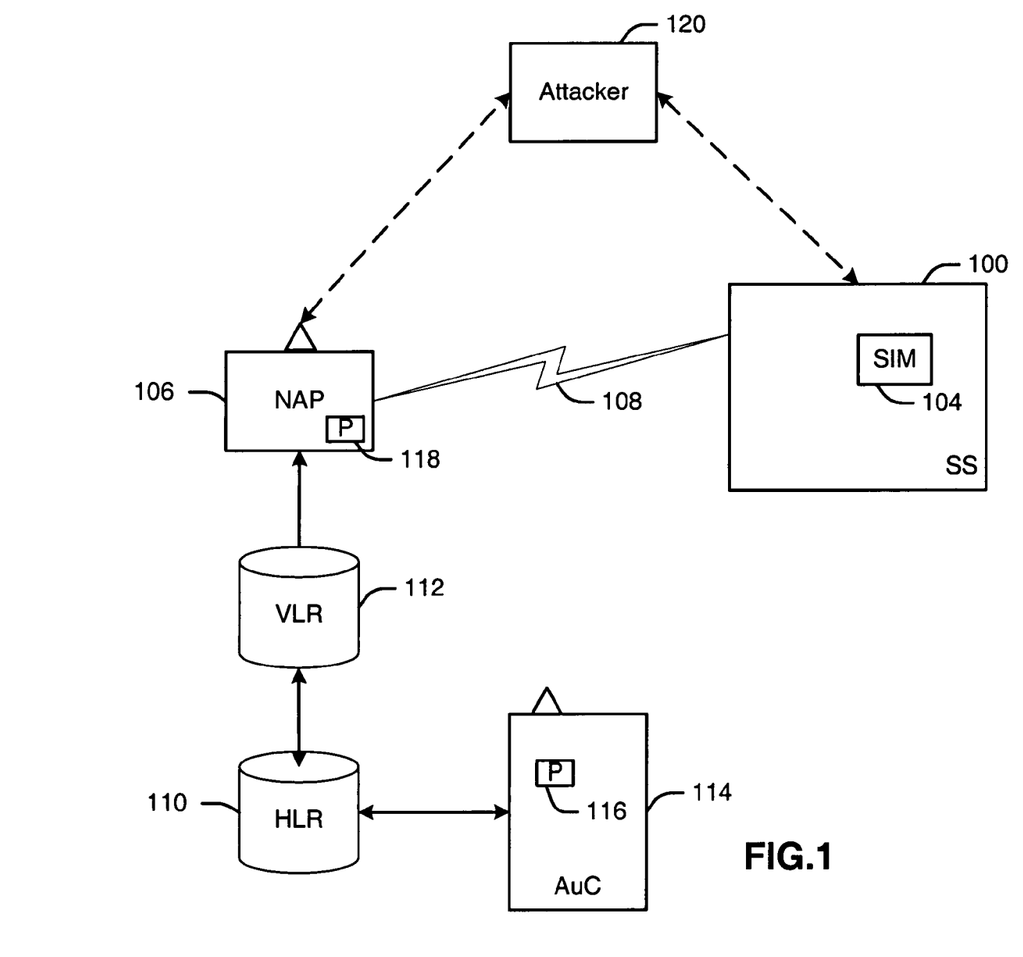
FIG. 1 illustrates a portion of a typical GSM network system which may be compromised by an attacker.

With reference now to FIG. 1 of the drawings, there is illustrated a portion of a typical GSM network system which may be compromised by an attacker. A user may communicate over the network by using a subscriber station 100, which may be or include a cellular phone, and a Subscriber Identity Module (SIM) card 104. Of course, it is to be understood that the teachings herein apply to various communications devices and are not limited to cellular phones. The SIM card 104 is a small piece of circuitry which may be placed within a cellular phone. The SIM card 104 may store personal information about a user, such as his phone number, secret key (explained in further detail below), phone book entries, and other details. Some of this information may be used so the user may be identified and authenticated to the network supplying the phone service. The SIM card 104 may also include processing capability, and encryption capability for voice and data transmissions before transmission from the subscriber station to the network. The SIM card 104 may optionally be moved from one device to another and/or different SIM cards 104 may be inserted into any GSM cellular phone. For example, if a user has one phone but uses it for both personal and business calls, he can change the SIM card depending on how he will be using the phone (one card contains his personal identity and data and the second card carries his business identity and data).

When a user powers up the subscriber station 100, it attempts to locate one or more Network Access Points (NAP) 106 to be used for communications. A NAP may include, for example, a base station or other hardware suitable for connecting to a GSM network. To do this, the subscriber station 100 monitors pilot signals sent from different NAPs. The subscriber station may choose the strongest pilot signals, which would identify one NAP as being suitable for establishing a link to the network. In the following description of the GSM network system, the subscriber station 100 establishes a link with one NAP 106.

After the subscriber station 100 is connected to the network via a link 108 established with the NAP 106, the network must determine the location of the subscriber station 100. A database such as a Visited Location Register (VLR) 112 may store an entry for every subscriber station in its local area, along with subscriber station's last known location. Subscriber stations may periodically inform their Home Location Register (HLR) 110 of their current location, allowing HLR 110 to update stored information accordingly and route incoming calls to the subscriber station. When a subscriber station is not roaming (i.e. when it is in the area served by its home operator), the functions of the HLR 110 and the VLR 112 may be combined. When used, the VLR 112 may be helpful for communicating between a subscriber station roaming in a foreign network and the subscriber station's own HLR 110 which is in the home network. It is to be understood that the concepts herein may be applied to wireless systems with and without VLRs.

After the network identifies the current location of the subscriber station 100, it may attempt to authenticate the user. Authentication is one part of GSM security measures. A user's secret key ($K_i$) is central to security in the GSM system, and one is used during authentication. Each user is assigned a random number as a secret key, referred to as $K_i$, stored in their SIM card 104 and in a database called the Authentication Center (AuC) 114. The secret key is carefully guarded as discovery by a third party would break down the system. The $K_i$ is never sent from the AuC 114, so it cannot be overheard in transmission. The $K_i$ also never leaves the SIM card 104. During authentication, the NAP 106 first asks the AuC 114 for a random number and an associated response. The AuC 114 includes a processor 116 which may generate the random number (RAND) and perform a security algorithm in which the RAND and the user's $K_i$ are used as inputs. The security algorithm may be in accordance with the A3/A8 authentication protocol, for example, though other protocols may be used as well. The outputs of this algorithm are the response (SRES) and a special encryption key, known as the session key ($K_c$). The SRES may be used to authenticate the user, and the $K_c$ may be used by both the subscriber station and the network to encrypt and decrypt communications data after authentication occurs.

After the AuC generates and calculates the RAND, SRES and $K_c$, it bundles the three values together in what is called an authentication triplet (triplet), and provides the triplet to the NAP 106. The NAP 106 then extracts the RAND from the triplet, and sends just the RAND to the subscriber station 100. The subscriber station 100 knows which authentication algorithms were used by the AuC to generate SRES and $K_c$. Thus, by using the same authentication algorithms, the subscriber station 100 may take the RAND received from the NAP and calculate the same SRES and $K_c$. As described above, these values are functions of $K_i$, the secret key stored on the SIM card 104 and available for use by the subscriber station 100.

Figure 2:
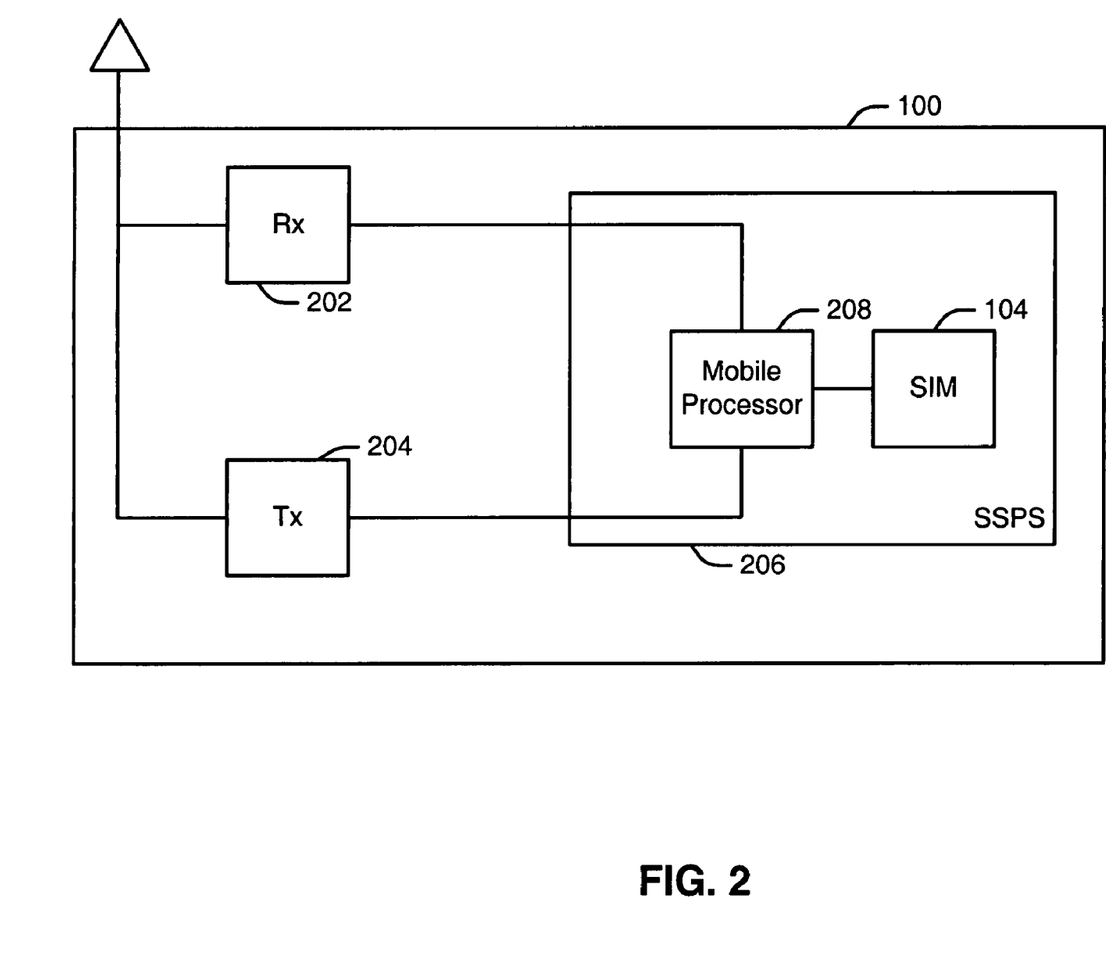
FIG. 2 illustrates components of a subscriber station which may be involved during authentication.

FIG. 2 illustrates additional components of the subscriber station 100 which may be involved during the authentication process. An analog front end may include a transceiver 200 having both a receiver 202 and a transmitter 204. The subscriber station 100 may also include a processing system 206 including a processor 208 resident on the user's cellular phone and the SIM card 104 which, as explained above, has its own processor.

Returning now to FIG. 1, once the subscriber station 100 (or its SIM card 104) calculates SRES and $K_c$, it can hold on to $K_c$ and send the SRES back to the NAP 106. If the NAP 106 is able to authenticate the subscriber station 100, then communications may proceed and each entity can use the $K_c$ to encrypt and decrypt communications data according to the encryption algorithm selected by the NAP and specified to the subscriber station 100. In order to authenticate the subscriber station 100, the NAP 106 first verifies the received the correct SRES is from the subscriber station 100. To do so, the NAP 106 may, via a processor 118, compare the SRES received from the subscriber station 100 and the SRES received from the AuC 114. If they do not match, then authentication fails. If they do match, however, then the subscriber is authenticated and communications may proceed.

As explained above, the MITM attack is conducted during the authentication procedure. When the NAP 106 sends a RAND to the subscriber station 100 for authentication, the RAND is intercepted by an attacker 120. The attacker 120 forwards the RAND to the legitimate user's subscriber station 100. The subscriber station 100, believing this authentication request legitimately comes from the NAP 106, computes the SRES as part of the normal authentication routine described above, and returns the SRES to the NAP 106. The SRES is again intercepted by the attacker 120, which forwards it on to the network. At this point, the attacker 120 appears "authenticated" to the NAP 106, and also has possession of both the RAND and the SRES, which it intercepted. The only part of a full authentication triplet the attacker 120 lacks is the $K_c$. However, the attacker 120 can use the weak encryption algorithm A5/2 to obtain this value.

For example, under normal conditions, when the NAP 106 verifies authentication, the NAP 106 sends a request for the subscriber station 100 to proceed with communications using A5/1 or A5/3 encryption (cipherstart message). During an attack, however, the attacker 120 can intercept the cipherstart message and, instead of forwarding it to the subscriber station 100, it changes the cipherstart message and instead tells the subscriber station 100 to use A5/2, the weak encryption algorithm. The A5/2 request appears to the subscriber station 100 to be a legitimate cipherstart message, so the subscriber station will begin encrypting its communications data with the A5/2 algorithm. The attacker 120, which is still intercepting communications between the NAP 106 and the subscriber station 100, may then employ cryptanalysis of A5/2 to retrieve the $K_c$. Once it knows $K_c$, the attacker 120 may act as a translator and communicate with the subscriber station 100 via A5/2 and communicate with the NAP 106 via whichever algorithm the NAP 106 specified in its cipherstart message, since the same $K_c$ works with any of the A5 algorithms. More importantly, at this point the attacker 120 has every piece of a valid authentication triplet, which it may then re-use for future sessions, such as to hijack phone calls or steal phone service by posing as an authenticated user.

Figure 3:
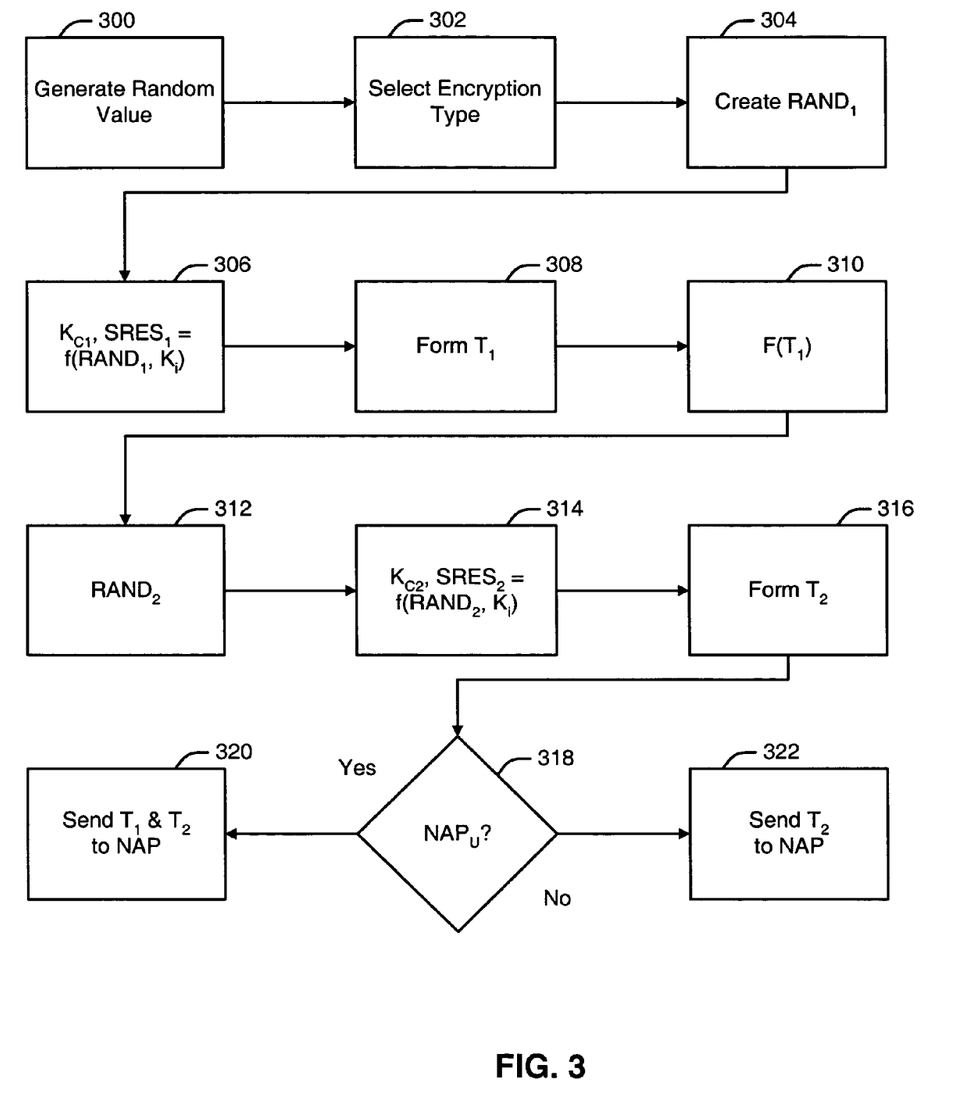
FIG. 3 is a flow diagram illustrating operation of an authentication center.

In order to prevent the theft of $K_c$ during authentication or active communications, the authentication process may include an additional step involving $K_i$ which, as explained above, cannot be intercepted by any third party. FIG. 3 is a flow diagram illustrating a procedure performed by an AuC to inject the additional $K_i$ step into a normal authentication routine. The procedure may be implemented with both legacy systems in which subscriber stations and network components (such as the NAP, VLR, a HLR) are old and upgraded systems in which network components are upgraded to recognize and respond to the new procedure. The procedure also works with systems including some legacy components and some upgraded components. First, at block 300, the AuC may generate a random value which may be modified to serve as a RAND in the authentication process. To modify the random value appropriately, the AuC may first select the encryption type for communication with the subscriber station at block 302. The selected encryption type may involve any encryption algorithm not easily compromised by a third party attacker. For example, the AuC may decide against selecting A5/2, which is known to be a weak encryption algorithm. The AuC may instead select A5/1 or A5/3, though other robust algorithms may be used as well.

After the AuC selects an encryption type, it modifies the random value at block 304, which results in a RAND value, $RAND_1$, to be used for authentication. $RAND_1$ may have a special format in that a certain number of its bits are set to a special value. This value may be recognized by both the subscriber station and the network access point, and may indicate which encryption type was selected at block 302. The value of these bits may thus form a "mandated encryption marker." The format of $RAND_1$, including the mandated encryption marker, may be in accordance with the teachings of an article entitled "Further Development of the Special RAND mechanism," Vodafone and Orange, 3GPP SA3 document S3-030588. However, those skilled in the art will recognize other RAND formats may be implemented as well, so long as some bits of $RAND_1$ are reserved to include special (not random) values that both describe the selected authentication type and are recognizable by upgraded hardware at the NAP and the subscriber station.

Once $RAND_1$ is known, the AuC may at block 306 proceed in accordance with the traditional authentication procedure, in which it uses a security algorithm to calculate a $K_C$ and an SRES corresponding to the $RAND_1$. The security algorithm may, for example, be in accordance with the A3/A8 authentication protocol. The resulting $K_C$ and SRES are denoted as $K_{C1}$ an $SRES_1$ since they correspond to $RAND_1$. At block 308, the AuC bundles these three values together to form a triplet $T_1$. Instead of passing this triplet to the NAP for authentication, however, the illustrative procedure performs additional security procedures involving $K_i$, to provide an extra layer of protection.

At block 310, the AuC performs a one-way function known as a pseudorandom function, in which the output can be reproduced given the same inputs, but if any of the input values is not known, the output cannot be reproduced because the output does not include any information about the unknown input. One type of function which may be used is a secure hash function such as SHA-1. Details regarding SHA-1 are provided in FIPS-180-1 and FIPS-180-2, NIST. Another suitable function may be a secure Message Authentication Code such as, for example, HMAC. Details regarding HMAC are provided in a document entitled "Hash based Message Authentication Code," by Krawczyk et. al, RFC2401. Of course, it is to be understood that the teachings herein may be implemented with any pseudorandom function and are not limited to SHA-1, HMAC or other types of secure hash or Message Authentication Codes.

The output of the pseudorandom function performed on triplet $T_1$ at block 310 is a seemingly random number. Although its sequence was actually carefully derived by the previous steps, its appearance is one of a randomly generated number, and it may be used as such. Thus, the output generated at block 310 may be used as a second RAND, $RAND_2$, in a secondary authentication operation. At block 314, a security algorithm may be implemented to calculate a second $K_C$ and a second SRES which correspond to the $RAND_2$. The security algorithm may again be in accordance with the A3/A8 authentication protocol. The resulting $K_C$ and SRES are denoted as $K_{C2}$ and $SRES_2$ since they correspond to $RAND_2$. At block 316, the AuC bundles these three values together to form a second triplet $T_2$.

At this point, the AuC has two triplets available for authentication of a subscriber station. Depending on whether the NAP includes upgraded hardware which can engage in a security method, the AuC may pass one or both of these triplets to the NAP for use during authentication. At block 318, the network determines whether the NAP comprises legacy hardware or upgraded hardware. This determination may be made by the AuC, the VLR or the HLR, or by some combination thereof. If the NAP comprises legacy hardware, then at block 320 the AuC sends only the second triplet $T_2$ to the NAP. In this case, authentication will proceed as usual, with the NAP and subscriber station using the values in $T_2$ to achieve authentication, and never using any of the $T_1$ values. If, on the other hand, the NAP comprises upgraded hardware which can support the illustrative security methodology, then at block 322 the AuC will send both triplets, $T_1$ and $T_2$, to the NAP.

Figure 4:
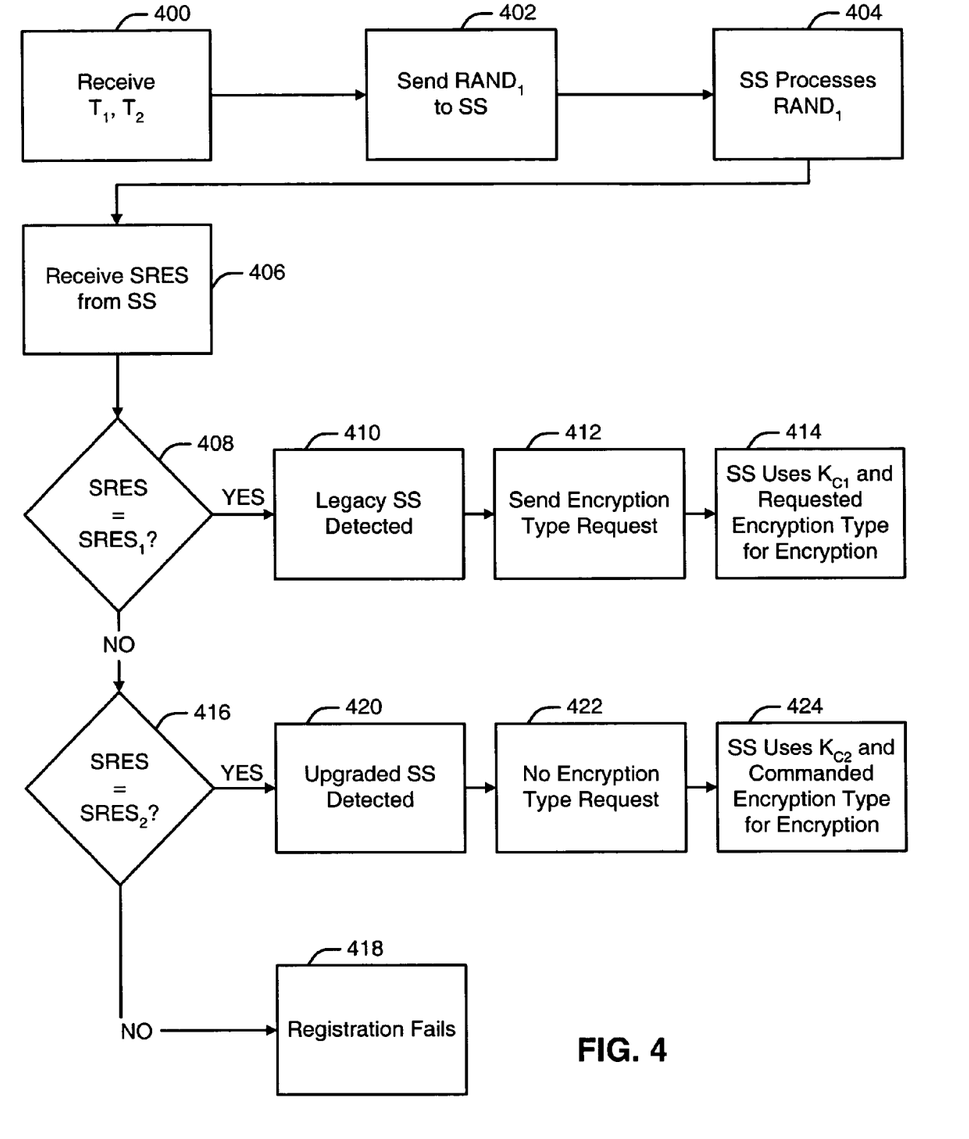
FIG. 4 is a flow diagram illustrating operation of an illustrative network access point.

FIG. 4 is a flow diagram illustrating operation of an illustrative upgraded network access point upon receipt of both triplets. At block 400, both triplets $T_1$ and $T_2$ are received from the AuC, either directly or through the VLR or HLR. Rather than sending the RAND from both triplets to the subscriber station, though, the NAP forwards only the first triplet's RAND, $RAND_1$. This is done to "test" whether the subscriber station comprises legacy or upgraded hardware, and thus whether the subscriber station like the NAP is capable of engaging in the illustrative security methodology. At block 404, the subscriber station processes $RAND_1$ and generates a response. The value of this response will depend upon whether the subscriber station comprises legacy or upgraded hardware. Thus, the description now turns to the particular details of the subscriber station processing, which are illustrated in FIGS. 5A and 5B.

Figure 5A:
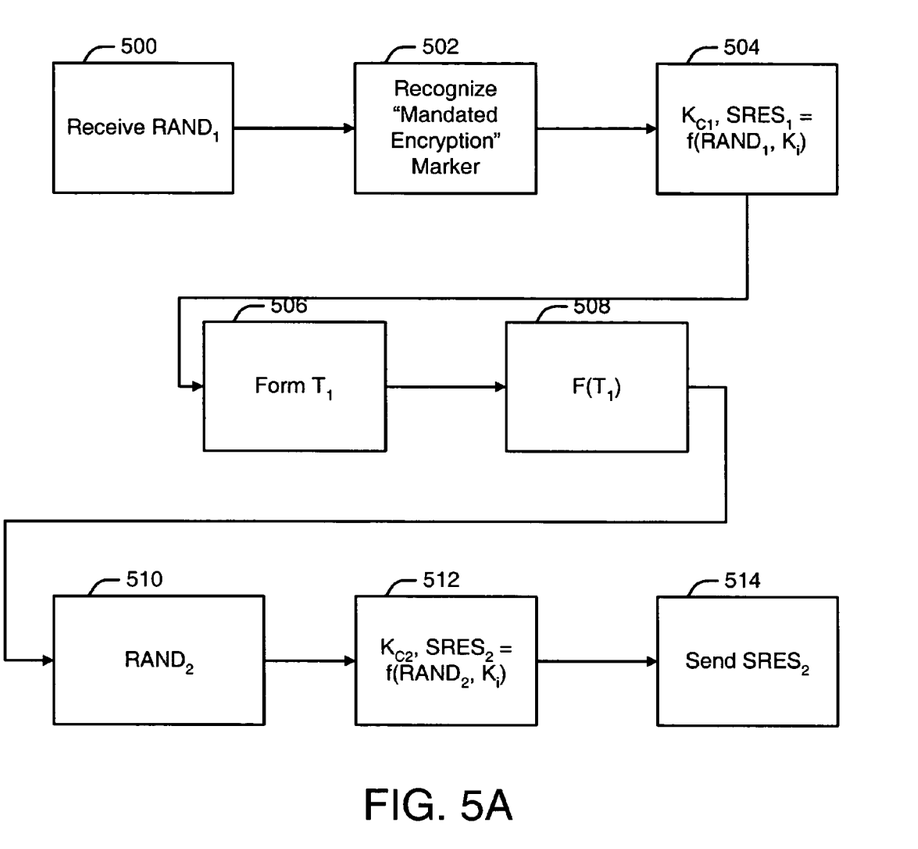
FIG. 5A is a flow diagram illustrating operation of a first illustrative subscriber station.
Figure 5B:
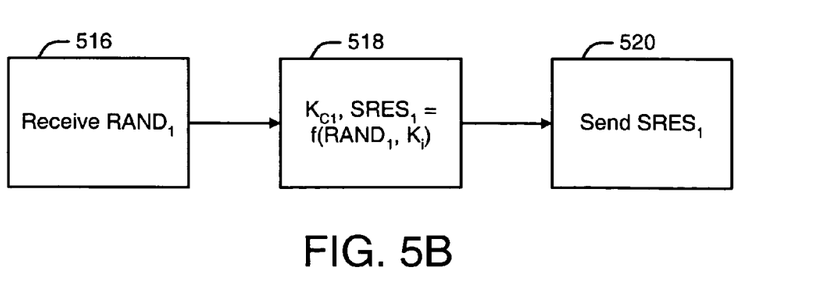
FIG. 5B is a flow diagram illustrating operation of a second illustrative subscriber station.

FIG. 5A is a flow diagram illustrating operation of an upgraded subscriber station engaged in authentication with the upgraded NAP. At block 500, the subscriber station receives the specially formatted $RAND_1$ from the NAP. Because it is an upgraded subscriber station, it will recognize the mandated encryption marker in the $RAND_1$, at block 502. Because the subscriber station recognized this marker, it knows the NAP is also upgraded and the subscriber station and the NAP may engage in the illustrative security methodology. First, at block 504, the subscriber station calculates the $K_{C1}$ and $SRES_1$ according to the normal authentication procedure. In other words, the SIM card may retrieve the $K_i$ and use it with $RAND_1$ to calculate $K_{C1}$ and $SRES_1$. However, instead of sending back the $SRES_1$ and using the $K_{C1}$ for encryption, the subscriber station continues with the illustrative security methodology in order to implement the extra layer of security. At block 506, it combines the $RAND_1$, $SRES_1$, and $K_{C1}$ to form a first triplet $T_1$. Then at block 508, the subscriber station performs a pseudorandom function, as explained above, to $T_1$. The output of this function at block 510 is $RAND_2$, the same value previously calculated in the AuC. The subscriber station then uses the $K_i$ stored in the SIM card to calculate $K_{C2}$ and $SRES_2$ at block 512. Finally, at block 514, the $SRES_2$ is sent back to the NAP.

If the subscriber station is not upgraded, it cannot engage in the illustrative security methodology described above. Yet, even a legacy subscriber station will be able to authenticate itself to the NAP using the specially formatted $RAND_1$. FIG. 5B is a flow diagram illustrating operation of a legacy subscriber station engaged in authentication with the upgraded NAP. At block 516, the subscriber station receives the specially formatted $RAND_1$ from the NAP. However, because the subscriber station is not upgraded, it cannot recognize the mandated encryption marker within the $RAND_1$. As such, the subscriber station believes the $RAND_1$ is merely a random number, and uses it as a normal RAND. That is, the subscriber station directs its SIM card to utilize the $K_i$ and calculate $K_{C1}$ and $SRES_1$, which is shown at block 518. At block 520, the subscriber station returns $SRES_1$ to the NAP for authentication.

Returning now to FIG. 4, at block 406 the NAP receives an SRES from the subscriber station. As explained above with reference to FIGS. 5A and 5B, this SRES value may be either $SRES_1$ or $SRES_2$, depending on whether the subscriber station was upgraded or legacy. Thus, at block 408 the NAP first determines whether the received value matches the $SRES_1$ it has from the $T_1$. If so, then the NAP knows the subscriber station was unable to recognize the special format of $RAND_1$ and implement the additional security mechanism. Thus, at block 410 the NAP detects the subscriber station comprises legacy hardware and is unable to engage in the illustrative security methodology. As such, the NAP must operate according to the traditional authentication procedure, and send a cipherstart message requesting the subscriber station begin using a particular encryption type, as indicated at block 412. The subscriber station also operates according to the traditional authentication procedure and, as shown at block 414, uses the $K_{C1}$ previously calculated (in FIG. 5B) to encrypt its communications data.

If, on the other hand, the NAP determines at block 408 the returned SRES does not match the $SRES_1$ it has from the $T_1$, then the NAP knows the subscriber station might include upgraded hardware capable of the illustrative security methodology. First, however, the NAP must verify the subscriber station sent back the proper response value to indicate this. Thus, at block 416 the NAP tests whether the SRES matches the $SRES_2$ it has from the $T_2$. If not, then at block 418 authentication fails. However, if a match is detected then at block 420 the NAP detects the subscriber station is an upgraded one. As such, the NAP knows at block 422 that no encryption type request need be sent in the cipherstart message, and that at block 424 the subscriber station will use the second session key $K_{C2}$ previously calculated (in FIG. 5A) to encrypt its communications data. An encryption type request might still be sent in order to avoid changing existing protocols, but this would not affect the choice of encryption algorithm. Moreover, if an attacker attempts to send a false request to the subscriber station indicating an encryption type other than that specified in the mandated encryption marker recognized at block 502, the subscriber station will recognize it is a false request and ignore it, such as by encrypting communications data in accordance with the encryption type specified in the marker, or by declining to send communications data at all.

Figure 6:
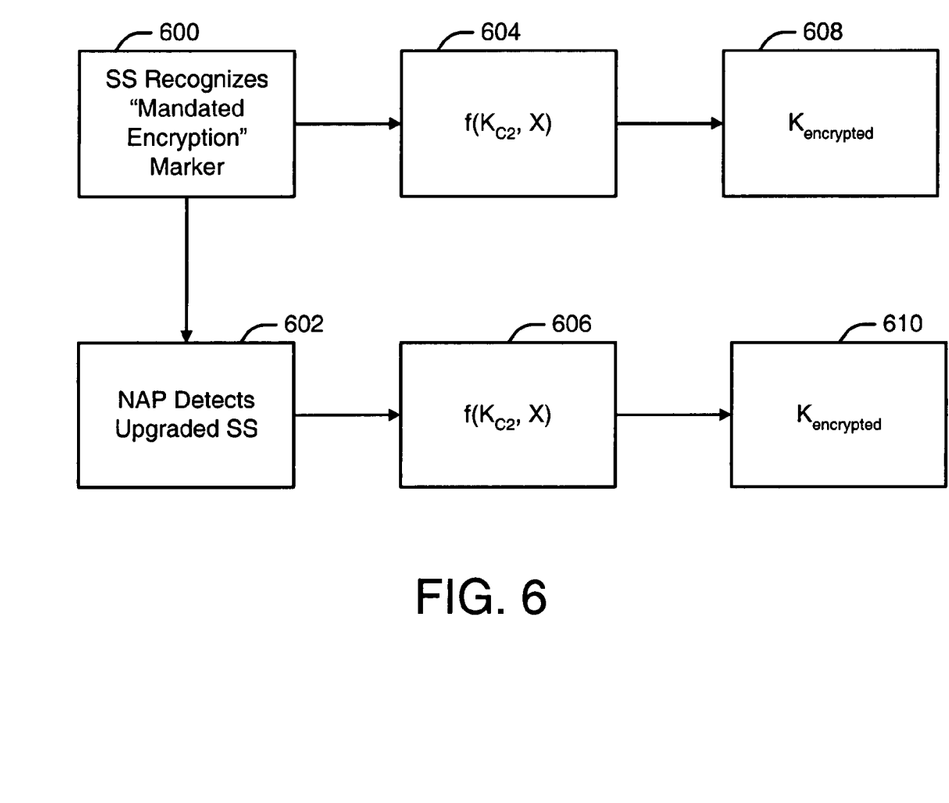
FIG. 6 is a flow diagram illustrating operation of a subscriber station and a network access center.

FIG. 6 is a flow diagram illustrating operation of a subscriber station and a network access point when each has verified the other is upgraded. As explained above, each one may use the $K_{C2}$ for encryption and decryption because it has been derived with a second layer of security using the well-guarded $K_i$. However, according to another feature the subscriber station and NAP may instead calculate yet another encryption key, based on the $K_{C2}$, to encrypt and decrypt communications. Doing so interjects yet another layer of security. At blocks 600 and 602, the subscriber station and NAP, respectively, detect the other is upgraded. Thus, each is aware the illustrative security methodology may be employed. Upon using this methodology and calculating the secure $K_{C2}$, however, the subscriber station may at block 604 create a new key as a function of $K_{C2}$ and some value "X." The NAP may calculate the same new key, at block 606. This new key may be the output of the particular function, as indicated at blocks 608 and 610. For example, where X is a cipher value, $K_{encrypted}$ may be a cipher-specific key. Where X is an authentication value, $K_{encrypted}$ may be an authentication key. These keys, though based on the same $K_{C2}$, may be respectively used for ciphering data and for authentication.

Figure 7:
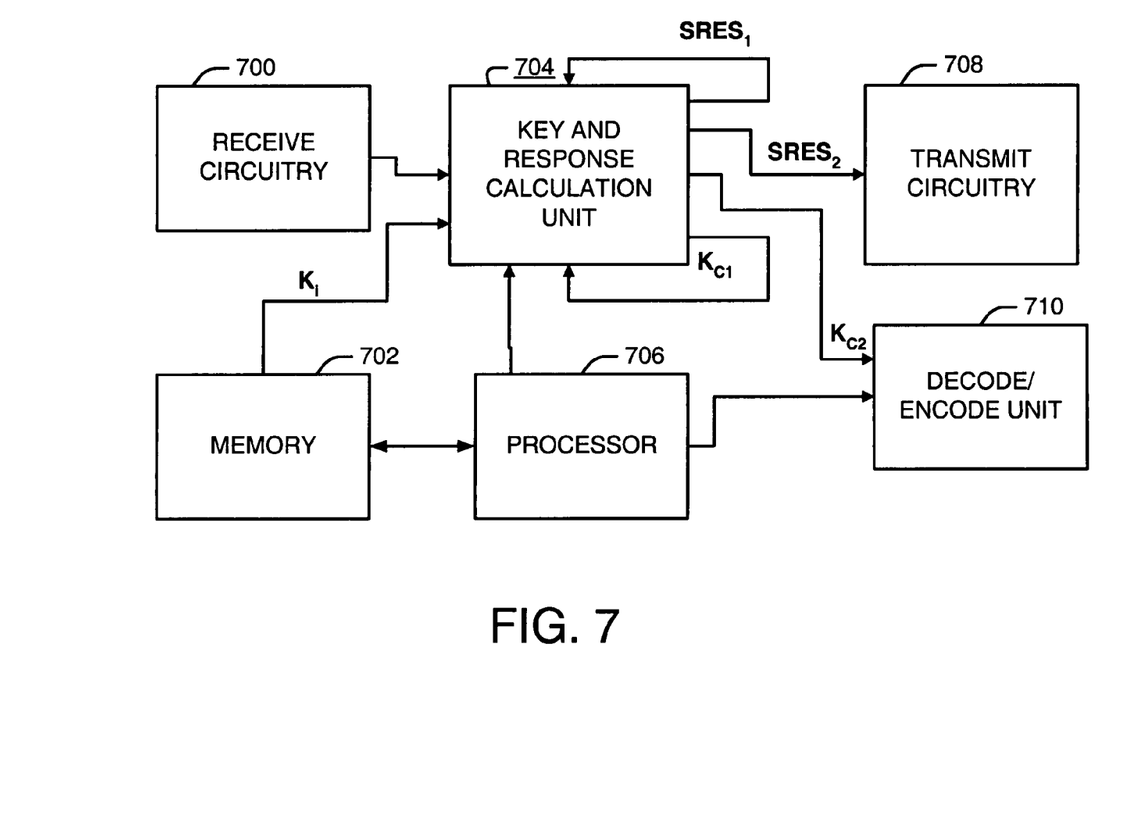
FIG. 7 illustrates a subscriber station according to one embodiment.

FIG. 7 illustrates a subscriber station according to one embodiment. As illustrated, the subscriber station includes receive circuitry 700 coupled to key and response calculation unit 704. The receive circuitry 700 receives authentication information, such as the RAND value, and provides this information to the key and calculation unit 704. The key and calculation unit 704 also receives the secret key for the subscriber station, $K_i$, from memory storage unit 702. From these inputs, the key and calculation unit 704 generates a first response $SRES_1$ and a first key $K_{C1}$, which provide feed back to key and calculation unit 704. The key and calculation unit 704 then generates a second response $SRES_2$ and a second key $K_{C2}$. The second response $SRES_2$ is provided to the transmit circuitry 708 for transmission to complete authentication, while the second key $K_{C2}$ is provided to encode/decode unit 710 for processing and receiving data. A processor 706 is also provided for coordination and control of the key and calculation unit 704, the encode/decode unit 710, and the memory storage unit 702. FIG. 7 provides a functional description of the operation of a subscriber station, wherein alternate embodiments may combine functional units or further specify individual functional blocks to implement the security mechanisms discussed herein.

While the specification describes particular embodiments of the present invention, those of ordinary skill can devise variations of the present invention without departing from the inventive concept. For example, the teachings herein refer to circuit-switched network elements but are equally applicable to packet-switched domain network elements. Also, the teachings herein are not limited to authentication triplet pairs but can also be applied to use of a single triplet including two SRES values (one of the customary format and one of the newer format disclosed herein).

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the embodiments disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of securing wireless communications with a network at a subscriber station, comprising:
  receiving, by a receiver, a random value from the network as a first signal transmitted on the network;
  calculating a first session key and a first response value as a function of the random value;
  calculating a second session key and a second response value as a function of the random value, first session key and first response value, wherein the function utilizes a second random value generated from the random value, first session key and first response value; and
  communicating the second response value to the network for authentication by generating a second signal for transmission to the network.

2. The method of claim 1, wherein the random value comprises an encryption marker identifying an encryption type for a communication.

3. The method of claim 2, wherein the marker comprises a plurality of bits that specify a predetermined sequence of values.

4. The method of claim 2, wherein the encryption type is different from A5/2 encryption.

5. The method of claim 1, further comprising receiving an encryption request that is inconsistent with the encryption type and ignoring the request.

6. The method of claim 5, further comprising encrypting communications data in accordance with the encryption type.

7. The method of claim 5, further comprising declining to transmit communications data in response to the encryption request being inconsistent with the encryption type.

8. The method of claim 1, further comprising:
retrieving a secret key stored in the subscriber station,
wherein calculation of the first session key and the first response key is also a function of the secret key.

9. The method of claim 1, further comprising:
modifying the random value,
wherein calculation of the second session key and the second response value comprises combining the modified random value, the first session key and the first response value to form an authentication triplet, and performing a hash function on the authentication triplet.

10. The method of claim 9, wherein the second session key and second response value are calculated as a function of the output of the hash function and a secret key that is stored on a SIM card in the subscriber station.

11. The method of claim 1, further comprising calculating an encrypted key as a function of the first session key and a predetermined value.

12. The method of claim 11, wherein the encrypted key comprises a cipher key.

13. The method of claim 11, wherein the encrypted key comprises an authentication key.

14. The method of claim 11, further comprising encrypting communications data with the encrypted key prior to communicating the data to the network.

15. A method of securing wireless communications with a subscriber station from a network, comprising:
generating a random value having a marker specifying an encryption type;
calculating a first session key and a first response value as a function of the random value;
calculating a second session key and a second response value as a function of the random value, first session key and first response value, wherein the function utilizes a second random value generated from the random value, first session key and first response value;
communicating the random value to the subscriber station;
receiving, by a receiver, a subscriber response value from the subscriber station in response to the random value; and
comparing the subscriber response value to each of the first and second response values.

16. The method of claim 15, wherein the marker comprises a plurality of bits that specify a predetermined sequence of values.

17. The method of claim 15, wherein the mandated encryption type is different from A5/2 encryption.

18. The method of claim 15, wherein the calculation of the first session key and first response value is also a function of a secret key associated with the subscriber station.

19. The method of claim 15, wherein the calculation of the second session key and second response value comprises:
combining the modified random value, the first session key and the first response value to form an authentication triplet; and
performing a hash function on the authentication triplet.

20. The method of claim 19, wherein the second session key and second response value are calculated as a function of the output of the hash function and a secret key that is associated with the subscriber station.

21. The method of claim 15, wherein the subscriber response value matches the first response value, and wherein the method further comprises calculating an encrypted key as a function of the first session key and a predetermined value.

22. The method of claim 21, further comprising receiving communications data from the subscriber station and decrypting the communications data with the encrypted key.

23. The method of claim 21, wherein the encrypted key comprises a cipher key.

24. The method of claim 21, wherein the encrypted key comprises an authentication key.

25. A subscriber station, comprising:
means for receiving a random value from the network;
means for calculating a first session key and a first response value as a function of the random value, and further for calculating a second session key and a second response value as a function of the random value, first session key and first response value, wherein the function utilizes a second random value generated from the random value, first session key and first response value;
means for communicating the second response value to the network for authentication; and
means for applying the second session key to encryption of data for transmission.

26. A network, comprising:
means for generating a random value comprising a marker specifying an encryption type;
means for calculating a first session key and a first response value as a function of the random value;
means for calculating a second session key and a second response value as a function of the random value, first session key and first response value, wherein the function utilizes a second random value generated from the random value, first session key and first response value;
means for communicating the random value to a subscriber station;
means for receiving a subscriber response value from the subscriber station in response to the random value; and
means for comparing the subscriber response value to each of the first and second response values.

27. A subscriber station, comprising:
a receiver configured to receive a random value from the network;
a processor system configured to calculate a first session key and a first response value as a function of the random value, and calculate a second session key and a second response value as a function of the random value, first session key and first response value, wherein the function utilizes a second random value generated from the random value, first session key and first response value;
an encryption unit adapted to receive the second session key for encryption and decryption of transmission data; and
a transmitter configured to send the second response value to the network for authentication.

28. The subscriber station of claim 27, wherein the processor system comprises a first processor on a communications device and a second processor on a SIM card.

29. The subscriber station of claim 28, wherein the communications device comprises a Global System Mobile cellular phone.

30. The subscriber station of claim 27, wherein the processor system is further configured to combine the random value, first session key and first response value to form an authentication triplet and perform a hash function on the authentication triplet.

31. The subscriber station of claim 27 wherein the processor system is further configured to calculate an encrypted key as a function of the first session key and a predetermined value.

32. The subscriber station of claim 27, further comprising:
memory storage unit for storing a secret key unique to the subscriber station,
wherein the processor calculates the second session key and the second response value as a function of the secret key, the random value, the first session key and the first response value.

33. The subscriber station of claim 27, wherein the random value further comprises an encryption marker identifying an encryption type for a communication.

34. The subscriber station of claim 33, wherein the processor system is further configured to receive an encryption request that is inconsistent with the encryption type and to ignore the request.

35. The subscriber station of claim 34, wherein the processor system is further configured to encrypt communications data in accordance with the encryption type.

36. The subscriber station of claim 33, wherein the processor system is further configured to decline to transmit communications data in response to the encryption request being inconsistent with the encryption type.

* * * * *